United States Patent [19]
Keskilohko

[11] Patent Number: 6,073,564
[45] Date of Patent: Jun. 13, 2000

[54] METHOD AND DEVICE FOR IMPROVING THE TRANSPLANTING OF SEEDLINGS

[75] Inventor: Altti Keskilohko, Säkylä, Finland

[73] Assignee: Lännen Tehtaat Oy, Iso-Vimma, Finland

[21] Appl. No.: 09/063,372

[22] Filed: Apr. 21, 1998

[51] Int. Cl.$^7$ .................................................. A01C 11/00
[52] U.S. Cl. .......................... 111/105; 47/901; 414/404; 414/414
[58] Field of Search .................... 111/104, 105, 111/106, 200, 900, 903, 904; 47/1.01, 901; 414/403, 404, 502, 518, 414; 377/6, 19, 130

[56] References Cited

U.S. PATENT DOCUMENTS

| | | | |
|---|---|---|---|
| 3,927,400 | 12/1975 | Knepler | 377/6 |
| 4,130,072 | 12/1978 | Dedolph | 111/105 X |
| 4,408,549 | 10/1983 | Ovarnstrom | 111/105 X |
| 4,481,893 | 11/1984 | Ovarnstrom | 111/105 |
| 5,676,072 | 10/1997 | Williames | 111/105 |

FOREIGN PATENT DOCUMENTS

| | | |
|---|---|---|
| 8-37832 | 2/1996 | Japan . |
| 8-103112 | 4/1996 | Japan . |
| 8-112012 | 7/1996 | Japan . |
| WO91/10352 | 7/1991 | WIPO . |

*Primary Examiner*—Victor Batson
*Attorney, Agent, or Firm*—Burns, Doane, Swecker & Mathis, L.L.P.

[57] ABSTRACT

A method and device for improving mechanical transplanting of balled seedlings involves detection of balls with deficient seedlings, such as those with no seedlings or undersized seedlings, with a sensor through an aperture in a compartment holding the ball. Deficient balls are allowed to exit from the compartment through a shutter, and replacement balls are provided from a seedling supply. The replacement seedling supply includes a cassette having one row of cells for seedlings and the cassette is advanced, as necessary, by a geared shaft engaging the side of the cassette. Alternatively, replacement seedlings are provided from a cultivating tray.

12 Claims, 5 Drawing Sheets

Fig. 2
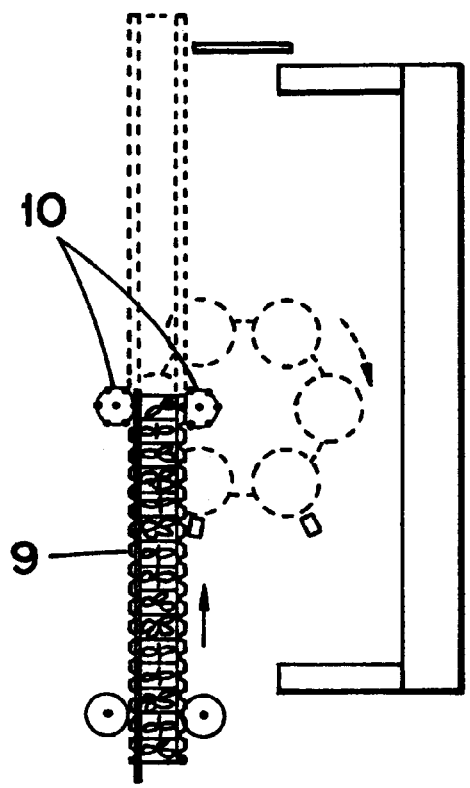
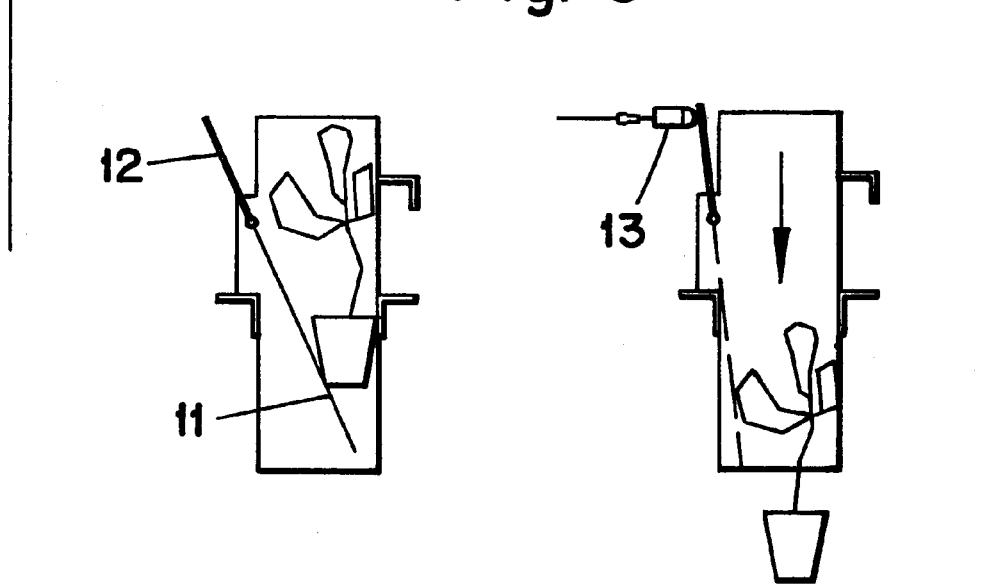
Fig. 3

METHOD AND DEVICE FOR IMPROVING THE TRANSPLANTING OF SEEDLINGS

FIELD OF THE INVENTION

The present invention relates to a method and device for rendering the transplanting of ball seedlings more effective. More particularly, the invention relates to a method for eliminating balls without seedlings using sensor technology, and to a device for said purpose.

BACKGROUND OF THE INVENTION

In the cultivation of plants, e.g. vegetables, with balled seedlings, the aim is to obtain a complete stand of plants in the field. For different reasons, after the germination stage the seedling trays usually contain a number of balls without seedlings. These empty balls were earlier sorted out manually before mechanical transplanting, or alternatively they were replaced with seedling-carrying balls following transplanting. In practice, the consequence of this is that the planting process is semiautomatic, whereby an operator supplies the machine only with seedling-carrying balls. Alternatively, automatic transplanting is first used, whereby the empty balls are set in the ground and a person walking behind the machine manually replaces the empty balls with seedling-carrying ones. This eliminates part of the economical benefit gained by the use of a continuously operating transplanting machine. If sorting or replacement is not carried out, the result is patchy field and crop losses.

To overcome the abovementioned disadvantage, it has been attempted to, e.g. remove the empty balls and fill the opening by, for example, temporarily speeding up the rate by which seedlings are fed to the planting chute. Characteristic for these methods are the difficulty of detection, use of complicated mechanical structures and vigorous handling of the ball and seedling.

From International Patent Application WO 91/10352, a detection method for plants, based on fluorescence, is known. According to said method, the fluorescence characteristic for, e.g., the chlorophyll is a plant, is detected by means of light filters and a camera. The method, however, requires relatively complicated optics and data processing.

In Japanese patent application 8-37832, a transplanting device is disclosed, comprising a mechanical switch for the detection of empty seedling balls. Detection requires physical contact with the stem or leaves of the seedling, and takes place on seedlings still within the cells of the cultivating tray.

Japanese patent application 8-112012 discloses a transplanting device where two similar cultivating trays are used as sources of seedlings, one as the main source and the other as a replacement source. Detection of the seedlings takes place on seedlings still within the cells of the tray, as in the previously mentioned Japanese application, and when a deficient specimen is detected, a seedling is extracted from the replacement tray instead. Seedlings from either tray are transferred into the planting chute through a Y-shaped tube.

Japanese patent application 8-103112 discloses a transplanting device where individual balled seedlings are carried from the cultivating tray to cups in a carousel-type transfer device, where detection takes place. The seedling is detected above the rim of the transfer cups. A shutter mechanism opens to drop an accepted seedling into a planting device, while rejected seedlings are carried off and substituted by replacement seedlings through a side channel opening into the planting chute. The side channel is supplied with individual replacement seedlings during use.

SUMMARY OF THE INVENTION

An improved method for the automatic transplanting of balled seedlings has now been invented, wherein detection of seedlings takes place in well-defined compartments by means of a sensor operating through apertures in said compartments.

According to one aspect of the present invention, an improved method is provided for the elimination of balls carrying no seedlings, and for their replacement with seedling-carrying balls during operation of an automatic transplanting machine. In accordance with said method, each seedling ball is brought into a measurement compartment provided with apertures, where a detection, utilizing sensor technology, is carried out to determine whether the ball carries a proper seedling. If no seedling is detected, the deficient ball is rejected and during the next step is replaced with a proper ball from a supply of replacement seedlings, comprising only presorted, proper specimens. The supply of replacement seedlings can be dimensioned according to the estimated failure percentace of the seedlings. If a seedling is detected in the ball, the rejection and replacement steps described above are bypassed. In the last step, the seedling ball is planted in a known manner.

According to another aspect of the present invention a device is provided for applying the method set forth above, wherein the seedling balls are removed from the cultivating tray in a previously known manner, and transferred to a compartment provided with apertures through which measurement can take place. Depending on the measurement result, the compartment either opens to allow a deficient ball to exit, or remains closed. If the ball has been rejected, the mechanism of the supply of replacement seedlings provides a new seedling in the compartment; if not, the supply of replacement seedlings remains in a waiting state. The proper ball is transferred to the planting stage, where the compartment opens and planting takes place in a normal manner. It is characteristic for the present invention, that the seedling is not squeezed or otherwise vigorously treated, and detection takes place through an aperture in said compartment whereby the position of the seedling is well defined. Though properly fixed in position for detection, the seedling in the compartment is not subject to any pressure, and the removal of a deficient ball as well as the delivery of a proper seedling are accomplished by gravity.

According to a third aspect of the present invention, a mechanism for supplying replacement seedlings is provided. Replacement seedlings are delivered from a position above the line of movement of the above-described seedling compartments, and are allowed to drop into a compartment that has been emptied of a deficient seedling ball. Preferably the replacement mechanism comprises a cassette having one row of cells for carrying seedlings. The cassette is preferably adapted to move horizontally, said movement provided by a mechanism actuated by the seedling detection system to shift the cassette the distance of one seedling cell each time lack of seedling is detected. Preferably, the shifting mechanism comprises means engaging in a rack-and pinion fashion with the outer surface of the cassette; most preferably the shifting mechanism comprises a geared shaft with its axis parallel to the length axis of the cassette and gears engaging corresponding racks on said cassette. In an alternative, the replacement seedling supply comprises a standard cultivating tray, from which seedlings are removed in the same manner as the regular seedlings fed to the transplanting machine.

BRIEF DESCRIPTION OF THE DRAWINGS

FIG. 2 is a representation of the cassette shown in FIG. 1, along its longitudinal axis.

FIG. 3 depicts the retaining mechanism which serves to keep the seedlings in the cassette while the latter is being manipulated.

DESCRIPTION OF THE PREFERRED EMBODIMENTS

Figure 1:
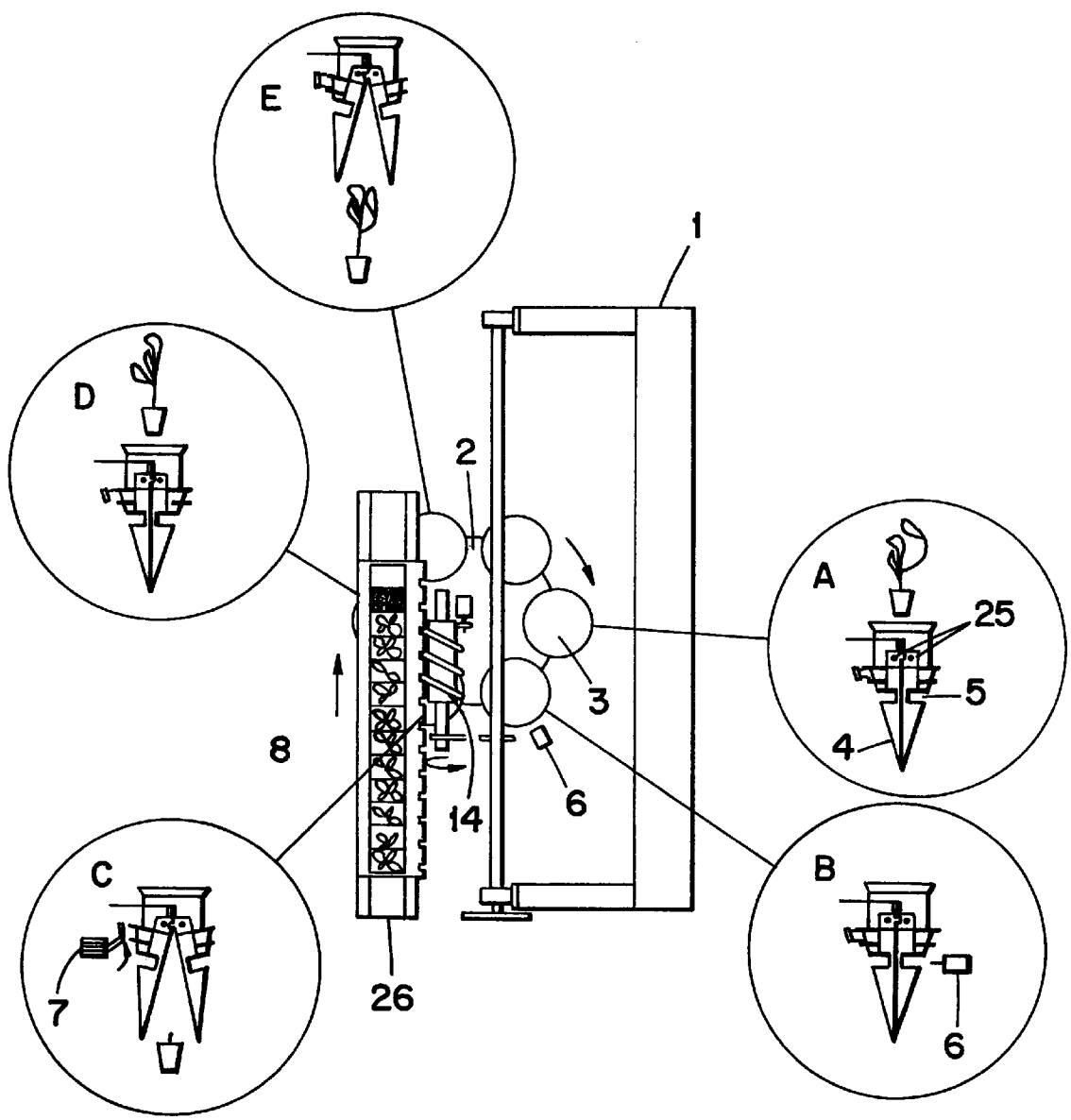
FIG. 1 is a top view of one embodiment of a device according to the present invention, wherein a six-compartment, carousel-type seedling transfer arrangement and a one-row cassette type replacement seedling supply are used. The different operating stages are represented in circles A–E, in which the seedling transfer compartments are shown from the side.

Preferred embodiments of the device of the present invention are described below, with reference to the enclosed drawings. The method is described by means of its procedural stages, as represented in FIG. 1, circles A through E. FIG. 1 is a horizontal section of a transplanting machine at the level of a device according to the invention, viewed from the top. A section of the body of the prior art transplanting machine (1) appears in the figure.

The seedling balls may be automatically separated from the cultivating trays in a known manner set forth in, e.g. U.S. Pat. No. 4,893,571, hereby incorporated by reference. The separating means, now shown in FIG. 1, removes the individual balls one at a time from the cultivating tray and and allows them to fall into a compartment (3), wherein the ball settles into a well-defined position (stage A). The lower part of the compartment consists of movable means, preferably a jaw-type shutter (4), normally kept closed by spring load and being able to open symmetrically relative to pivot points (25).

The shape and size of said movable means are determined by the properties of the balls to be handled. A plurality of said compartments are attached to the body of a transfer means (2), which can be a rotatable disc as in FIG. 1, whereby the transfer mechanism is of a carousel type. The transfer means can also be, for example, an endless belt type conveyor or equivalent. To guide balls of various sizes into said compartments when dropped from above, a centering funnel (now shown) of appropriate size and shape can be used in the upper part of said compartment. Each compartment comprises in its sides at least one aperture (5), preferably two. The transfer means (2) is adapted to move in an intermittent or a continuous manner, and in synchronization with the other parts of the transplanting machine. In the device of FIG. 1, the carousel-type transfer means having six compartments rotates clockwise during operation.

The detection of a seedling is carried out in stage B by means of at least one optical or other appropriate sensor (6), operating through said apertures (5). Preferably, a transmitter-receiver combination type photoelectric cell sensor is used, reacting on reflections. For this type of sensor to operate reliably, it is preferable to have apertures on both sides of the compartment, as shown in FIG. 1, otherwise interfering background reflections from the compartment wall opposite the aperture may occur. The background situation farther away, outside the compartment, can be kept outside the working range of the sensor by adjusting the sensitivity of the sensor.

The edges of the aperture or apertures (5) are designed to allow detection with dead zones, and to allow guidance of the ball in between the shutter jaws to settle in the compartment undisturbed. Depending on the location of the apertures and the sensor, detection may take place immediately above the upper surface of the seedling ball, whereby it is determined whether the ball carries a seedling at all, or at a higher level whereby undersize seedlings may also be discarded.

As the transfer means rotates, a compartment having received a ball in stage A reaches the working range of the sensor (6), a contact mechanism working synchronously with the other parts of the device activates the sensor (6), which thus is operative during the period when the compartment aperture travels past the sensor (stage B). If the sensor registers a seedling stem or leaf in the aperture, a signal is generated. The sensor signal is carried to a control unit (now shown in the figure), which controls operation according to the state of said signal. If the absence of a signal indicates absence of a seedling, as the transfer means (2) rotates into the next position (stage C) a solenoid (7) is activated, engaging a level causing the jaws forming the lower part of the compartment to open, as shown in stage C, and the empty ball exits by means of gravity without disturbing the planting procedure. If the sensor signal indicates the presence of a seedling in the ball, solenoid (7) is not activated and the compartment jaws (4) stay closed in stage C.

The device of FIG. 1 comprises a cassete-type replacement seedling supply. A compartment having been emptied at state C and moved to stage D as the transfer means rotates, a seedling-carrying ball is dropped into said compartment. In the embodiment shown in FIG. 1, the replacement seedling supply comprises a cassette (8), adapted to move stepwise on a support (26) and having one row of cells for replacement seedling. As the cassette (8) moves one step, a ball drops into an emptied compartment through an opening in the cassette support at the replacement position. The means for advancing the cassette may be, for example, electrical, mechanical, pneumatic or a combination of these. Preferably, the cassette is advanced by a geared shaft (14), the axis of which is parallel to the longitudinal axis of the cassette and the gears engaging with one side of the cassette, as more closely described below with reference to FIG. 4.

In stage E, an actuator, which may be fixedly mounted to engage the shutter mechanism as a compartment moves into position, engages the same lever as solenoid (7) in stage C causing jaws (4) in the lower part of the compartment to open, thus allowing the ball to drop into a planting chute below the plane of the drawing.

Replacement seedling cassettes may be coupled together to form a train. The stepping movement of the cassettes may also be provided, as shown in FIG. 2, by means of, e.g. cogweels or equivalent (10) having an appropriate division and engaging corresponding racks in the sides of the cassettes (9). Another solution is the use of a lever or rod moving synchronously with the seedling feed, and at the moment of replacement engaging the feed mechanism of the replacement seedling supply, as set forth below in connection with the embodiment of FIGS. 5 and 6.

FIG. 3 represents a replacement seedling supply cassette viewed along its longitudinal axis. The cassettes may have spring-loaded flaps (11) preventing replacement seedlings from dropping out of the cassette through the bottom as the cassette is handled. The flaps comprise levers (12) protruding through the sides of the cassette. As a cassette is loaded onto its support on the transplanting machine, adequately mounted means (13) engages levers (12) and causes the flap to open. Thus, a replacement seedling arriving at the replacement position may drop freely into a compartment. A cassette of the type described above is preferably loaded with presorted seedlings. Alternatively, seedlings are grown directly in the cassettes.

Figure 4:
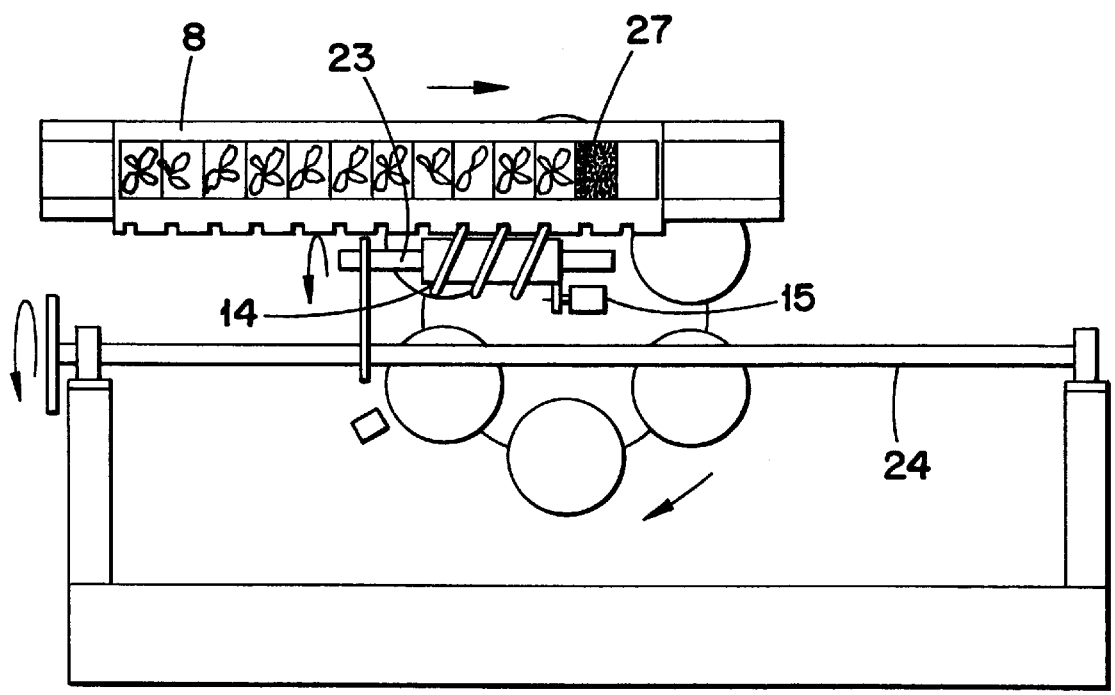
FIG. 4 shows a preferable embodiment of the feed mechanism for the cassette type replacement seedling supply.

FIG. 4 shows in detail an embodiment of the cassette transfer mechanism, wherein the transfer is provided by a geared shaft (14), the pitch of which preferably corresponds to the cell partition of a cassette (8). An inner shaft (23) is continuously driven by a drive shaft (24) of the transplanting machine, while the geared outer shaft adapted as a sleeve on said inner shaft is stationary when seedling replacement is not required. A solenoid switch (15), operating according to a control signal which reflects the signal transmitted by the seedling detector, connects the geared outer shaft to the continuously rotating inner shaft (23) for the period of one shaft revolution in case seedling replacement is required, Thus, the cassette (8) moves a distance corresponding to one cell, a replacement seedling ball reaches the opening (27) at the replacement position (D in FIG. 1), and is allowed to fall into a compartment that has been cleared of a deficient ball as described above.

An advantage of the design of FIGS. 1 and 4 is the self-arresting function of the cassette transfer mechanism; a separate latch device is not necessary.

The replacement seedling supply can be accomplished by other means than the cassette systems depicted in FIGS. 1 to 4. One solution is an endless belt conveyor. Such a conveyor may operate on a supporting surface above the level of the seedling transfer compartments, whereby seedlings are stepwise conveyed to an opening in said surface, at the replacement position of the seedling transfer mechanism (position D of FIG. 1) The conveyor may feature evenly spaced, open-bottomed compartments adapted to hold presorted seedlings. A drive mechanism is actuated to shift the conveyor the distance of one replacement seedling compartment when replacement is required.

Figure 5:
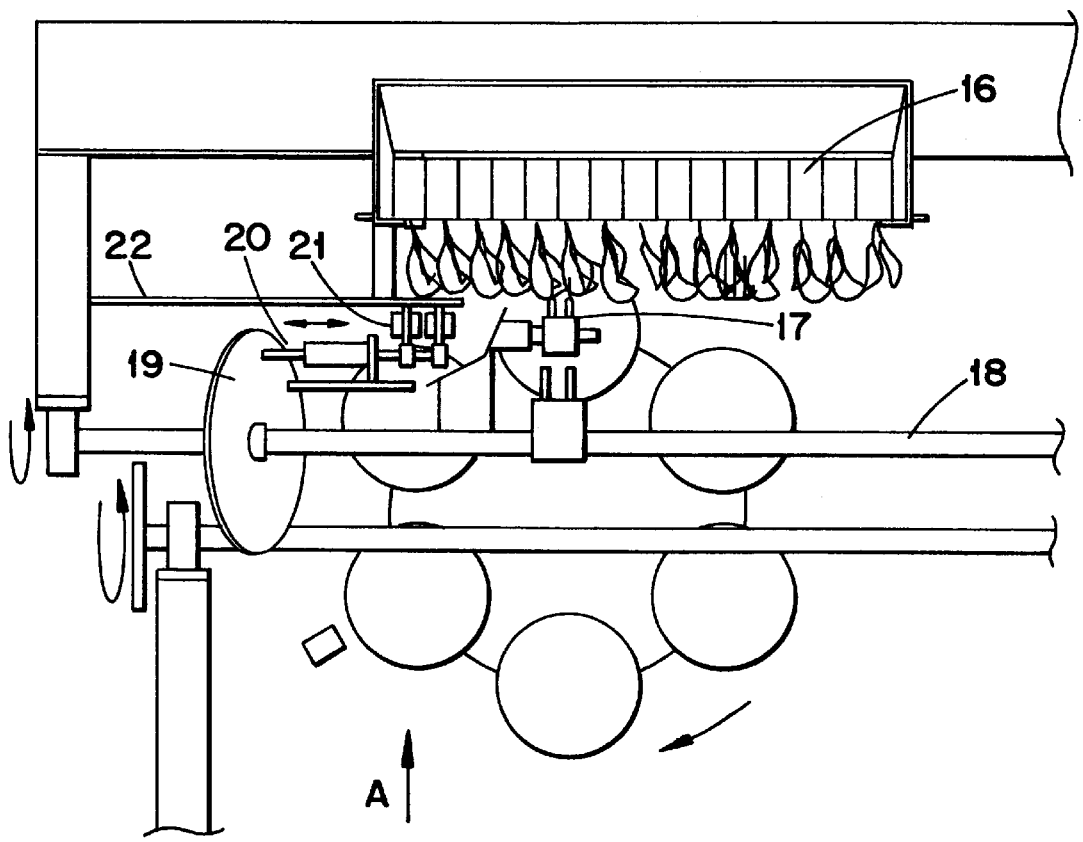
FIG. 5 is a representation of an alternative embodiment of the present invention, wherein the replacement seedling supply is implemented using the same type of mechanism as in the main feed or seedlings according to the prior art. Replacement seedlings are thereby supplied directly out of the cultivating trays.
Figure 6:
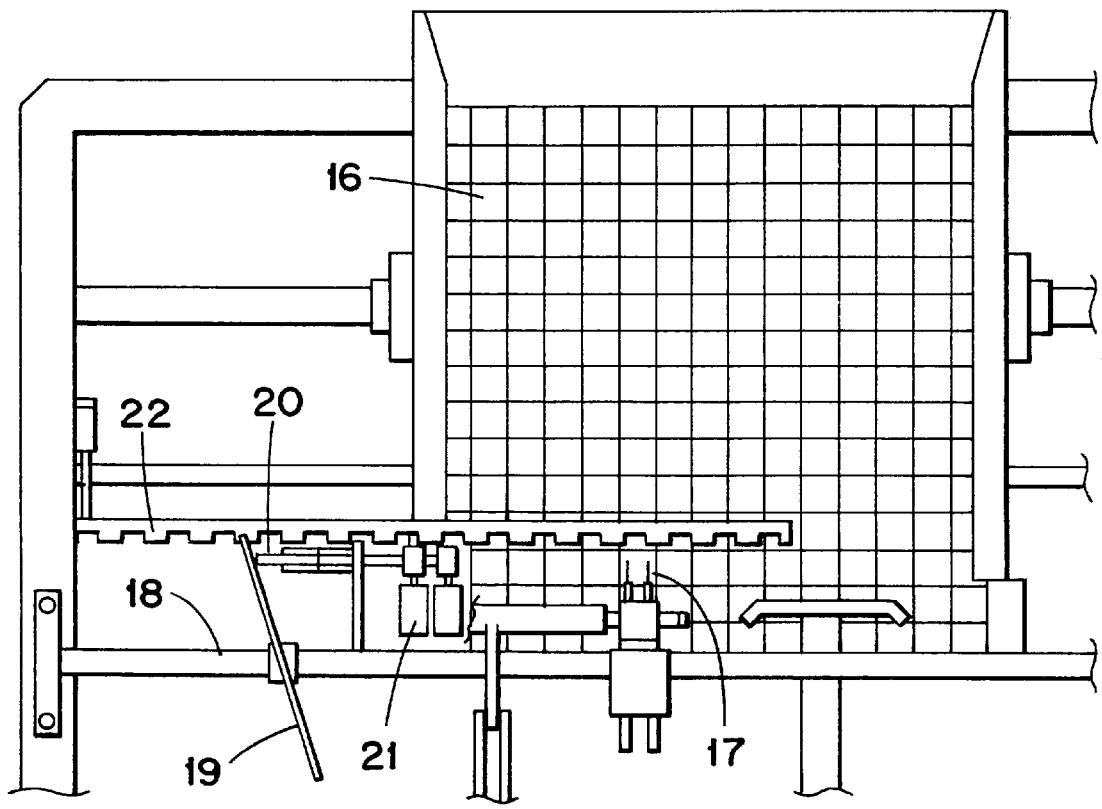
FIG. 6 represents the device showed in FIG. 5, viewed from direction A indicated in FIG. 5.

FIGS. 5 and 6 are top and side views of another embodiment of the replacement mechanism, wherein the feed of replacement seedlings is arranged essientially in the manner of the regular seedling feed arrangement for transplanting machine as disclosed in U.S. Pat. No. 4,893,571. The replacement seedlings initially reside in the cells of a normal cultivating tray, well known in the art, (16) set on its edge, its vertical movement controlled by a so-called rib drum (not shown) in a manner also well known in the art. Balls are removed from the tray by means of a push bar (not shown) pushing from the bottom of a cell brought into position for seedling removal. The ball is thereby seized by two transfer prongs, the tips of which penetrate the ball on both sides of the seedling. The seedling is turned into an upright position and a fork-like release means disengages the ball from the transfer prongs. The above-described mechanism for removing the ball from the tray performs an idle motion at an empty tray cell until a replacement is required, at which instance the tray is shifted and a replacement seedling is brought to the site of the seedling removal mechanism. The horizontal movement of the tray is preferably provided as follows: A disc (19) mounted at an angle at its center on the revolving shaft (18) actuates, while revolving, a spring-loaded pusher shaft (20), which thus carries out an oscillating movement. According to the control signal and with the aid of solenoid (21), this movement is transferred to a gear rack (22) forming part of the tray shifting mechanism. The driving force required for shifting the tray in the opposite direction for every second row in a tray is conveniently provided e.g. by the return movement of the pusher shaft (20). The same feed principle can be, in a unidirectional mode, applied when using a cassette-type replacement seedling supply as described above. In all respects other than the supply of replacement seedlings, a device according to FIGS. 5–6 may operate as in the embodiment of FIG. 1.

The control of operation and the synchronization of moving parts in the device can be accomplished by mechanical and/or electrical means. For example, an electronic, programmable logic controller can be used in a known manner, which controller receives input signals from the sensor and from means detecting the positions of seedling transfer compartments and other components, and the output signals of which control the opening of the compartment jaws and the function of the replacement seedling supply. Coordination of the components of a device according to the present invention may also be provided mainly by mechanical means if the use of electronics in field conditions is to be avoided.

I claim:

1. A seedling ball replacement device for removing deficient seedling balls carrying deficient seedlings and replacing the deficient seedling balls with proper seedling balls carrying proper seedlings during automatic transplanting, comprising;

compartments for retaining and transferring seedling balls, the compartments comprising at least one side aperture and a shutter for allowing a detected deficient seedling ball to exit from the compartment by gravity;

a sensor for detecting through the aperture if the compartment is carrying one of the deficient seedling balls or one of the proper seedling balls;

replacement means for replacing the detected deficient seedling ball that has been exited through the shutter with a replacement proper seedling ball by dropping the replacement proper seedling ball into the exited compartment from a supply of the replacement proper seedling balls located above the compartments; and planting means for planting the proper seedling balls.

2. The device as defined in claim 1, further comprising moving means for moving the compartments from one position to another position for separate operational steps.

3. The device as defined in claim 1, wherein the compartments are attached to a rotatable disk.

4. The device as defined in claim 1 wherein the sensor is a photo-electric sensor.

5. The device as defined in claim 1, wherein the compartments have two apertures located in opposite sides of each of the compartments.

6. The device as defined in claim 1, further comprising an electrical control system for controlling operation of the shutter, the sensor, the replacement means and the planting means.

7. The device as defined in claim 1, wherein the replacement means includes cassettes divided into one row of cells for seedling balls, and a transfer mechanism for the cassettes.

8. The device as defined in claim 7, wherein the transfer mechanism includes a geared shaft, engaging a side of one of the cassettes.

9. The device as defined in claim 8 wherein the geared shaft is adapted to shift the cassettes a distance of one cell during one revolution of the shaft.

10. The device as defined in claim 1, wherein the supply of replacement proper seedling balls includes a cultivating tray.

11. A method for removing deficient seedling balls carrying deficient seedlings, and replacing the deficient seedling balls with proper seedling balls carrying proper seedlings during automatic transplanting, comprising the steps of:

a) transferring one of the deficient seedling balls or proper seedling balls to a compartment having at least one side aperture at a level above an upper surface of the one of the deficient seedling balls or proper seedling balls, a lower part of the compartment including a shutter for allowing one of the deficient seedling balls to exit by gravity when the shutter is opened;

b) determining whether the compartment carries one of the deficient seedling balls by using a signal generated by at least one sensor working through the at least one side aperture;

c) when a deficient seedling ball is detected in the compartment, opening the shutter and allowing the detected deficient seedling ball to exit from the compartment;

d) providing a replacement proper seedling ball in the compartment if the detected deficient seedling ball has been exited;

e) planting a proper seedling ball.

12. The method as defined in claim 11 comprising the further step of transferring the compartment to a new position.

* * * * *